(12) United States Patent
Lai et al.

(10) Patent No.: US 12,356,342 B2
(45) Date of Patent: Jul. 8, 2025

(54) MODEM PERFORMANCE ENHANCEMENT VIA SMART TRANSMISSION POWER DISTRIBUTION

(71) Applicant: MEDIATEK INC., Hsinchu (TW)

(72) Inventors: Chih-Chieh Lai, Hsinchu (TW); Yi-Hsuan Lin, Hsinchu (TW); Ming-Yuan Cheng, Hsinchu (TW); Wei-Yu Lai, Hsinchu (TW); Wei-Jen Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 446 days.

(21) Appl. No.: 17/750,520

(22) Filed: May 23, 2022

(65) Prior Publication Data

US 2023/0379844 A1  Nov. 23, 2023

(51) Int. Cl.
*H04W 80/06* (2009.01)
*H04W 52/14* (2009.01)
*H04W 52/22* (2009.01)
*H04W 52/36* (2009.01)

(52) U.S. Cl.
CPC ....... *H04W 52/367* (2013.01); *H04W 52/146* (2013.01); *H04W 52/225* (2013.01); *H04W 80/06* (2013.01)

(58) Field of Classification Search
CPC ............. H04W 52/367; H04W 52/146; H04W 52/225; H04W 80/06
See application file for complete search history.

(56) References Cited

U.S. PATENT DOCUMENTS

| 10,154,467 | B2 | 12/2018 | Bontu et al. | |
|---|---|---|---|---|
| 10,588,088 | B1 * | 3/2020 | Pawar | H04W 52/367 |
| 2016/0205631 | A1 | 7/2016 | Chen et al. | |
| 2017/0331433 | A1 * | 11/2017 | Khlat | H03F 1/0244 |
| 2023/0362836 | A1 * | 11/2023 | Chang | H04W 52/346 |

FOREIGN PATENT DOCUMENTS

| CN | 104349447 A | * | 2/2015 | ........... H04B 17/391 |
|---|---|---|---|---|
| TW | 201419904 A | | 5/2014 | |

OTHER PUBLICATIONS

PE2E—Search Machine Translation of CN-104349447-A, published on Feb. 11, 2015. (Year: 2015).*
Chinese language office action dated Sep. 21, 2023, issued in application No. TW 112106284.
Chinese language office action dated Jun. 20, 2023, issued in application No. TW 112106284.

* cited by examiner

*Primary Examiner* — Rafael Perez-Gutierrez
*Assistant Examiner* — Gilbert M Grant
(74) *Attorney, Agent, or Firm* — McClure, Qualey & Rodack, LLP

(57) ABSTRACT

A power-adjusting method for uplink transmission is provided. The power-adjusting method is applied to user equipment (UE). In response to the UE transmitting a first packet carrying a specific message to a network node, the power-adjusting method includes the UE increasing the transmission power to transmit the first packet.

12 Claims, 3 Drawing Sheets

MODEM PERFORMANCE ENHANCEMENT VIA SMART TRANSMISSION POWER DISTRIBUTION

BACKGROUND OF THE INVENTION

Field of the Invention

The invention generally relates to power-adjusting technology, and more particularly, to a power-adjusting method in which the UE may adjust the transmission power used to transmit a packet based on what the packet carries.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In 5G NR, in Transmission Control Protocol (TCP) transmission, the packet sender (e.g. a network node) carefully adjusts the size of the congestion window (CWND) (i.e. the size of packet that the sender can send at a time) based on the feedback of packet loss or a delay from the receiver (e.g. a UE) to avoid congestion in the network. The CWND might decrease when the sender fails to receive the TCP Acknowledgement (ACK) sent by the receiver. However, decreased CWND will cause the TCP Downlink Throughput (DL Tput) to suffer and lead to a failure to achieve the maximum capacity of the network.

Therefore, how to reduce packet loss and delays from the receiver (e.g. a UE) in the uplink transmission is a topic that is worthy of discussion.

BRIEF SUMMARY OF THE INVENTION

A power-adjusting method and user equipment (UE) are provided to overcome the problems mentioned above.

An embodiment of the invention provides a power-adjusting method for uplink transmission. The power-adjusting method is applied to user equipment (UE). The power-adjusting method includes the following step: in response to the UE transmitting a first packet carrying a specific message to a network node, the UE increases transmission power to transmit the first packet.

In some embodiments, the UE decreases the transmission power to transmit the second packet in response to the UE transmitting a second packet carrying normal data to the network node.

In some embodiments, the average of a first transmission power used in transmitting the first packet and a second transmission power used in transmitting the second packet meets the power requirement.

In some embodiments, the power requirement is set based on the time averaged power density (TA-PD) or the time averaged specific absorption rate (TA-SAR).

In some embodiments, the specific message may be Transmission Control Protocol (TCP) ACK, a TCP NACK, a Radio Link Control (RLC) Status Protocol Data Unit (PDU), or traffic that has high sensitivity with latency. The traffic may be gaming data, Augmented Reality (AR) data, Virtual Reality (VR) data, or Internet Protocol (IP) data.

An embodiment of the invention provides user equipment (UE). The UE includes a radio frequency (RF) signal processing device and a processor. The RF signal processing device transmits packets to a network node. The processor is coupled to the RF signal processing device. In response to the transmitter transmitting a first packet carrying a specific message to the network node, the processor increases the transmission power to transmit the first packet.

An embodiment of the invention provides a computer-readable medium. The computer-readable medium stores one or more instructions and operates with a user equipment (UE). In response to the instructions having been executed by the UE, the UE executes a plurality steps. The steps comprise that in response to the UE transmitting a first packet carrying a specific message to a network node, increasing, by the UE, a transmission power to transmit the first packet.

Other aspects and features of the invention will become apparent to those with ordinary skill in the art upon review of the following descriptions of specific embodiments of the power-adjusting method and UE.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
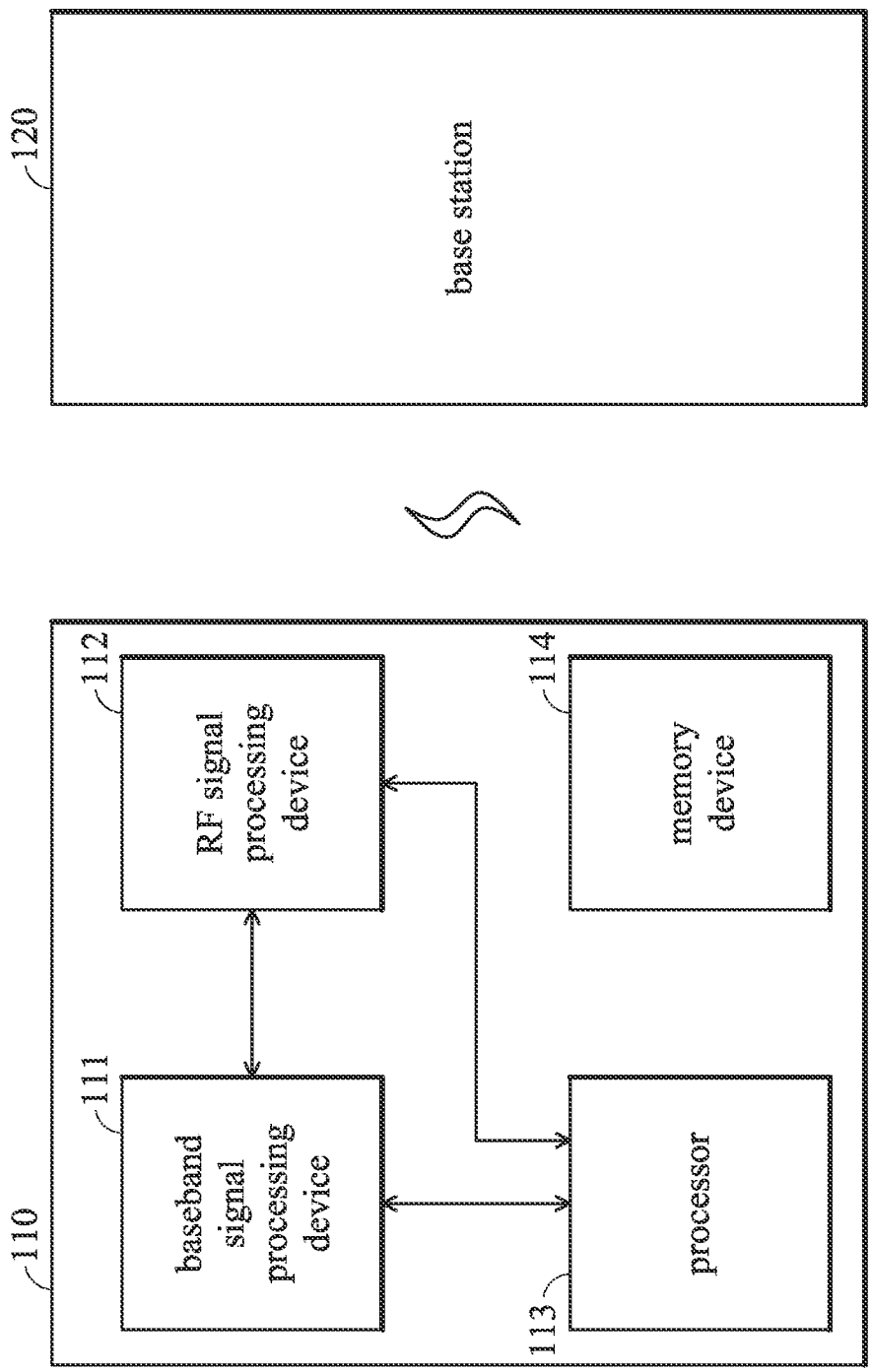
FIG. 1 is a block diagram of a wireless communications system according to an embodiment of the invention.

FIG. 1 is a block diagram of a wireless communications system according to an embodiment of the invention. As shown in FIG. 1, the wireless communications system may comprise user equipment (UE) 110 and a network node 120. It should be noted that, in order to clarify the concept of the invention, FIG. 1 presents a simplified block diagram in which only the elements relevant to the invention are shown. However, the invention should not be limited to what is shown in FIG. 1.

As shown in FIG. 1, the UE 110 may comprise at least a baseband signal processing device 111, a radio frequency (RF) signal processing device 112, a processor 113, a memory device 114, and an antenna module comprising at least one antenna. It should be noted that, in order to clarify the concept of the invention, the UE 110 of FIG. 1 presents a simplified block diagram in which only the elements relevant to the invention are shown. However, the invention should not be limited to what is shown in FIG. 1.

In the embodiments of the invention, the UE 110 may be a smartphone, a Personal Data Assistant (PDA), a pager, a laptop computer, a desktop computer, a wireless handset, or any computing device that includes a wireless communications interface.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, an analog-to-digital converter (ADC) and a digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software modules of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a random access memory (RAM); a non-volatile memory such as a flash memory or a read-only memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). It should be noted that, in some embodiments of the invention, the UE 110 may be extended further to comprise more than one antenna and/or more than one radio module, and the invention should not be limited to what is shown in FIG. 1.

In the embodiments, the network node 120 may be a base station, a gNodeB (gNB), a NodeB (NB) an eNodeB (eNB), an access point, or an access terminal, but the invention should not be limited thereto. In the embodiments, the UE 110 may communicate with the network node 120 through the fifth generation (5G) communication technology or 5G New Radio (NR) communication technology, but the invention should not be limited thereto.

According to an embodiment of the invention, when the RF signal processing device 112 of the UE 110 transmits a packet which carries a specific message to the network node 120, the processor 113 of the UE 110 may increase the transmission power to transmit the packet. In addition, when the RF signal processing device 112 of the UE 110 transmits a packet which only carries normal data to the network node 120, the processor 113 of the UE 110 may decrease the transmission power to transmit the packet. It should be noted that the packet can also carry both of the specific message and the normal data. When the UE 110 transmits this packet carrying both of the specific message and the normal data to the network node 120, the processor 113 of the UE 110 may also increase the transmission power to transmit the packet.

According to an embodiment of the invention, the specific message may be a Transmission Control Protocol (TCP) ACK, a TCP NACK, a Radio Link Control (RLC) Status Protocol Data Unit (PDU), or traffic that has high sensitivity with latency, but the invention should not be limited thereto. The traffic that has high sensitivity with latency may be gaming data, Augmented Reality (AR) data, Virtual Reality (VR) data or Internet Protocol (IP) data, but the invention should not be limited thereto.

According to an embodiment of the invention, the average of a first transmission power used for transmitting a packet which carries the specific message and a second transmission power used for transmitting a packet which only carries normal data may meet the power requirement. According to an embodiment of the invention, the power requirement is set based on the time averaged power density (TA-PD) standard for Frequency Range 2 (FR2) of 5G frequency bands or the time averaged specific absorption rate (TA-SAR) standard for Frequency Range 1 (FR1) of 5G frequency bands.

Figure 2:
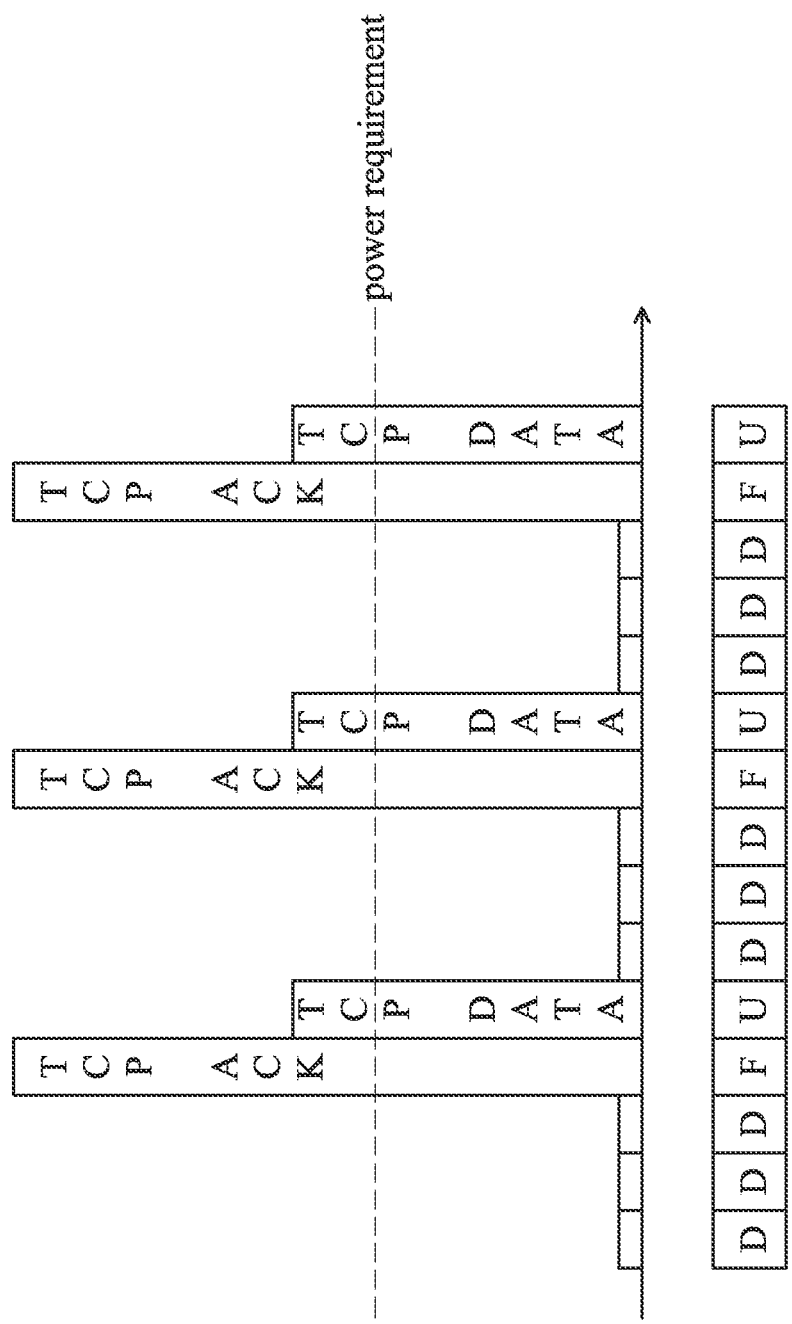
FIG. 2 is a schematic diagram illustrating different transmission power levels for uplink transmission according to an embodiment of the invention.

Taking FIG. 2 as an example, FIG. 2 is a schematic diagram illustrating different transmission power levels for uplink transmission according to an embodiment of the invention. As shown in FIG. 2, when the RF signal processing device 112 of the UE 110 transmits a packet which carries a TCP ACK to the network node 120 through a flexible slot (i.e. "F" in FIG. 2) of a Physical Uplink Shared Channel (PUSCH), the processor 113 of the UE 110 may increase the transmission power to transmit the packet. In addition, when the RF signal processing device 112 of the UE 110 transmits a packet which only carries normal TCP data to the network node 120 through an uplink slot (i.e. "U" in FIG. 2) of the PUSCH, the processor 113 of the UE 110 may decrease the transmission power to transmit the packet. In this example, the average of a first transmission power when transmitting a packet which carries the TCP ACK and a second transmission power when transmitting a packet which carries the normal TCP data may meet the power requirement specified in the TA-PD standard. That is to say, the average of the first transmission power used in transmitting a packet which carries the TCP ACK and the second transmission power used in transmitting a packet which carries the normal TCP data may not exceed the highest transmission power specified in the TA-PD standard. It should be noted that FIG. 2 is only used to illustrate the embodiment of the invention, but the invention should not be limited thereto.

Figure 3:
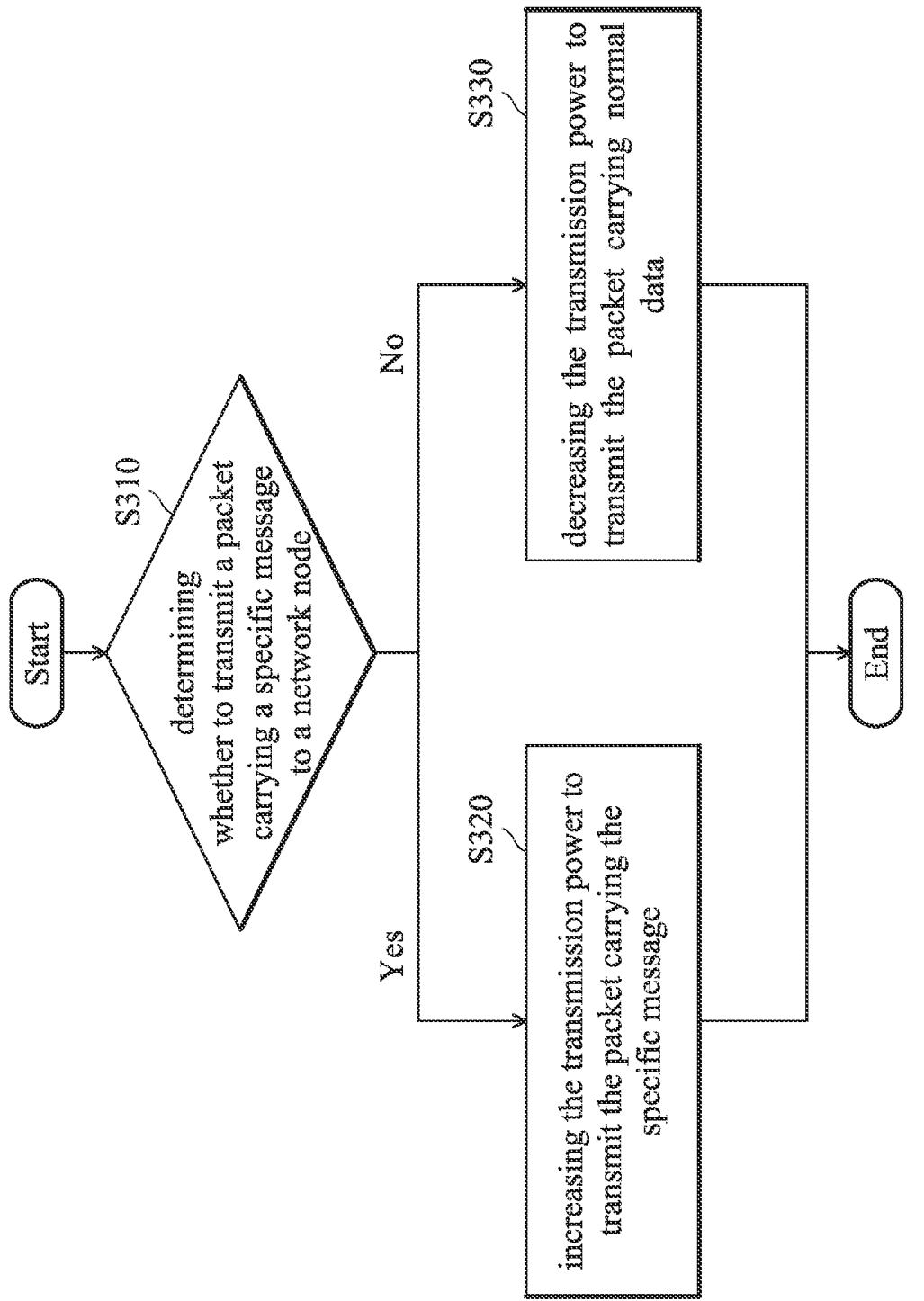
FIG. 3 is a flow chart illustrating a power-adjusting method for uplink transmission according to an embodiment of the invention.

FIG. 3 is a flow chart illustrating a power-adjusting method for uplink transmission according to an embodiment of the invention. The power-adjusting method can be applied to the UE 110. As shown in FIG. 3, in step S310, the UE 110 determines whether to transmit a packet carrying a specific message to a network node.

In response to the UE 110 transmitting a first packet carrying the specific message to the network node, step S320 is performed. In step S320, the UE increases the transmission power to transmit the first packet carrying the specific message.

In response to the UE 110 transmitting a second packet only carrying normal data to the network node, step S330 is performed. In step S330, the UE 110 decreases the transmission power to transmit the second packet carrying normal data.

In an embodiment of the invention, in the power-adjusting method, the average of a first transmission power when transmitting the first packet and a second transmission power when transmitting the second packet may meet power requirement. The power requirement is set based on the time averaged power density (TA-PD) or the time averaged specific absorption rate (TA-SAR).

In an embodiment of the invention, in the power-adjusting method, the specific message may be Transmission Control Protocol (TCP) ACK, a TCP NACK, a Radio Link Control (RLC) Status Protocol Data Unit (PDU), or traffic that has high sensitivity with latency. The traffic may be gaming data, Augmented Reality (AR) data, Virtual Reality (VR) data or Internet Protocol (IP) data.

In the power-adjusting method for uplink transmission of the invention, a smart transmission power distribution is provided to enhance the modem performance of the UE. Specifically, when the UE 110 transmits the packet carrying the specific message to the network node, the UE can increase the transmission power to transmit the packet to reduce the packet loss or delay. If the specific message is a TCP ACK for example, as the packet loss or delay is reduced, the chance of decreasing the size of congestion window (CWND) will be reduced. Therefore, the Downlink Throughput (DL Tput) will not usually be degraded because of the decreased CWND, i.e. the modem performance of the UE will be enhanced.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power-adjusting method for uplink transmission, applied to a user equipment (UE), comprising:
   in response to the UE transmitting a first packet carrying a specific message to a network node, increasing, by the UE, a transmission power to transmit the first packet; and
   in response to the UE transmitting a second packet carrying normal data to the network node, decreasing, by the UE, the transmission power to transmit the second packet,
   wherein an average of a first transmission power when transmitting the first packet and a second transmission power when transmitting the second packet meets a power requirement.

2. The power-adjusting method of claim 1, wherein the power requirement is set based on a time averaged power density (TA-PD) or a time averaged specific absorption rate (TA-SAR).

3. The power-adjusting method of claim 1, wherein the specific message is Transmission Control Protocol (TCP) ACK, a TCP NACK, a Radio Link Control (RLC) Status Protocol Data Unit (PDU), or a traffic that has high sensitivity with latency.

4. The power-adjusting method of claim 3, wherein the traffic is gaming data, Augmented Reality (AR) data, Virtual Reality (VR) data or Internet Protocol (IP) data.

5. A user equipment (UE), comprising:
   a radio frequency (RF) signal processing device, transmitting packets to a network node; and
   a processor, coupled to the RF signal processing device, wherein in response to the RF signal processing device transmitting a first packet carrying a specific message to the network node, the processor increases a transmission power to transmit the first packet,
   wherein in response to the RF signal processing device transmitting a second packet carrying normal data to the network node, the processor decreases the transmission power to transmit the second packet, wherein an average of a first transmission power when transmitting the first packet and a second transmission power transmitting the second packet meets a power requirement.

6. The UE of claim 5, wherein the power requirement is set based on a time averaged power density (TA-PD) or a time averaged specific absorption rate (TA-SAR).

7. The UE of claim 5, wherein the specific message is Transmission Control Protocol (TCP) ACK, a TCP NACK, a Radio Link Control (RLC) Status Protocol Data Unit (PDU), or a traffic that has high sensitivity with latency.

8. The UE of claim 7, wherein the traffic is gaming data, Augmented Reality (AR) data, Virtual Reality (VR) data or Internet Protocol (IP) data.

9. A non-transitory computer-readable medium stores one or more instructions and operates with a user equipment (UE), and in response to the instructions having been executed by the UE, the UE executes a plurality steps, comprising:
  in response to the UE transmitting a first packet carrying a specific message to a network node, increasing, by the UE, a transmission power to transmit the first packet; and
  in response to the UE transmitting a second packet carrying normal data to the network node, decreasing, by the UE, the transmission power to transmit the second packet,
  wherein an average of a first transmission power when transmitting the first packet and a second transmission power when transmitting the second packet meets a power requirement.

10. The non-transitory computer-readable medium of claim 9, wherein the power requirement is set based on a time averaged power density (TA-PD) or a time averaged specific absorption rate (TA-SAR).

11. The non-transitory computer-readable medium of claim 9, wherein the specific message is Transmission Control Protocol (TCP) ACK, a TCP NACK, a Radio Link Control (RLC) Status Protocol Data Unit (PDU), or a traffic that has high sensitivity with latency.

12. The non-transitory computer-readable medium of claim 11, wherein the traffic is gaming data, Augmented Reality (AR) data, Virtual Reality (VR) data or Internet Protocol (IP) data.

* * * * *